United States Patent [19]

Evans

[11] Patent Number: 5,067,313
[45] Date of Patent: Nov. 26, 1991

[54] PACKAGING DEVICE WITH LOOP ATTACHMENT MECHANISM AND SKIN BRAKE

[75] Inventor: Alfred J. Evans, Raleigh, N.C.

[73] Assignee: Delaware Capital Formation, Inc., Apex, N.C.

[21] Appl. No.: 526,060

[22] Filed: May 18, 1990

[51] Int. Cl.⁵ .................. B65B 43/42; B65B 51/05; B65B 61/14

[52] U.S. Cl. .................. 53/576; 53/134.1; 53/138.4; 452/30; 452/35

[58] Field of Search .......... 53/576, 138 A, 134, 53/128, 134.1, 138.4, 128.1; 452/30, 35, 186

[56] References Cited

U.S. PATENT DOCUMENTS

| | | | |
|---|---|---|---|
| 661,436 | 11/1900 | Atkinson | 452/35 X |
| 1,881,183 | 10/1932 | Griffith | 452/30 X |
| 3,694,853 | 10/1972 | Greider | 452/35 |
| 4,165,593 | 8/1979 | Niedecker | 53/134 X |
| 4,537,006 | 8/1985 | Pieri | 53/134 |
| 4,577,370 | 3/1986 | Kolkross | 452/35 X |
| 4,675,945 | 6/1987 | Evans | 53/138 A |
| 4,766,713 | 8/1988 | Evans | 53/138 A |

FOREIGN PATENT DOCUMENTS

2730121  1/1979  Fed. Rep. of Germany ........ 53/134

Primary Examiner—John Sipos
Attorney, Agent, or Firm—Allegretti & Witcoff, Ltd.

[57] ABSTRACT

In a stuffing machine for stuffing comminuted material in casing to form chubs, the machine comprising a stuffing horn for the passage of comminuted material and for the provision of casing, a casing brake for controlling casing withdrawal from the horn in relation to the exiting of comminuted material from the horn means, a clip applying apparatus for applying upstream and downstream clips to the casing and a looper assembly for applying loops to the upstream clip. The machine also includes a product support comprising a helical spring mounted adjacent the discharge end of the casing brake defining and extending along the path of the stuffed casing, the spring having a diameter sized to permit the spring to surround the stuffed casing exiting the casing brake and having a lateral strength to support the stuffed casing.

3 Claims, 7 Drawing Sheets

PACKAGING DEVICE WITH LOOP ATTACHMENT MECHANISM AND SKIN BRAKE

BACKGROUND OF THE INVENTION

This invention relates to food processing machinery, and more particularly to packaging machines such as stuffing machines of the type which make sausages and similar stuffed meat and stuffed food products. Most particularly, this invention relates to a stuffing machine incorporating a looper assembly, and a product spring support for casing exiting the casing brake.

Sausage making and the making of similar stuffed meat and food products have become highly automated. As a result of significant, valuable research in the United States, a variety of machines have been successfully developed for the automated and semi-automated production of stuffed sausages, meats, and foods. One such machine is disclosed in U.S. Pat. No. 4,766,713, issued on Aug. 30, 1988 to Alfred J. Evans, for a Packaging Device Including Dual Clip Attachment Apparatus, incorporated by reference. In a machine such as that disclosed in the identified patent, sausage material is pumped from a vat to a stuffing horn assembly. Shirred casing is applied over the end of a stuffing horn. The casing and material pumped to the horn leave the horn simultaneously, through a casing brake. The stuffing material fills the casing and the casing maintains the material under slight pressure. The casing brake permits the casing to exit under uniform tension. Adjacent the casing brake, dual product clippers intermittently acts to void the casing past the brake and clip the stuffed casing, to define the end of an exiting product and the beginning of the next product. A looper mechanism downstream of the clippers feeds hanging loops to the downstream clipper, where the loops are attached under the downstream clips.

Other notable machines are disclosed in U.S. Pat. No. 4,675,945 issued on June 30, 1987 to Alfred Evans et al., U.S. Pat. No. 4,847,953 issued July 18, 1989, and U.S. patent application Ser. No. 07/352,885 filed May 17, 1989 in the names of Alfred J. Evans and R. Clay Dunigan entitled Improved Semi-Automatic Stuffing Machine, Casing Brake and Turret Assembly, now abandoned all incorporated by reference. In the machines of the identified patent and applications, mechanisms are provided for movement of the casing brake, to intermittently relieve tension on the casing during clipping of product.

While the machine of U.S. Pat. No. 4,766,713 has proven highly desirable, some users of the machine have desired to fill casings in excess of recommended diameters. To date, no machines have been able to accomplish such overstuffing without cutting of the product casing under the loops.

SUMMARY OF THE INVENTION

In a principal aspect, the present invention proceeds with a discovery that overstuffing causes overstress of casing during voiding. The overstress leads to cutting of the product casing under the loops. Based on this discovery, the invention comprises, in part, an improved stuffing machine of the type including a frame, a product discharge horn, means for maintaining casing on the outside of the horn for withdrawal therefrom, brake means supported on the frame for controlling casing withdrawal from the horn, and clip attachment means including dual, upstream and downstream clippers supported by the frame for fastening dual clips about the casing withdrawn from the horn. The dual clips include upstream clips and downstream clips. In such a machine, a looper assembly means is supported on the frame upstream of the clip attachment means for feeding hanging loops to the upstream clipper for attachment to the casing withdrawn from the horn with the upstream clip.

The invention further comprises the casing brake mechanism and horn having specialized portions mounted on the machine for movement relative to each other to and from a stuffing position of the casing brake means and the stuffing horn and to and from a clipping position of the casing brake means and the stuffing horn. In the stuffing position, a stuffing-level tension is applied to the casing. In the clipping position, a reduced tension is applied.

The invention further comprises the casing brake mechanism having a product spring support for exiting stuffed casing.

These and other principal aspects the invention are more full appreciated by a reading of the detailed description of the preferred embodiment of the invention, which follows.

BRIEF DESCRIPTION OF THE DRAWING

The accompanying drawing illustrates the preferred embodiments of the invention, and the machine of the drawing is not the only form which the invention as claimed may take. The drawing and the following detailed description of the preferred embodiment are intended to limit the claims only as consistent with the law of claim interpretation, whereby claims are interpreted in light of the specification and drawing.

For orientation of the reader to the drawing, and for ease of beginning of reading of the following description, a brief description of the drawing is as follows.

The description which follows refers to the componentry of the machine in such spatial terms as "upper", "lower" "left", "right", etc. Terms such as these, which depend of the specific spatial orientation of the components, are intended for the aid of the reader, and except as incorporated into the claims, not as a limitation on the possible orientation of components in any possible alternate, but covered, embodiment of the invention.

DETAILED DESCRIPTION OF THE PREFERRED EMBODIMENT

Figure 1:
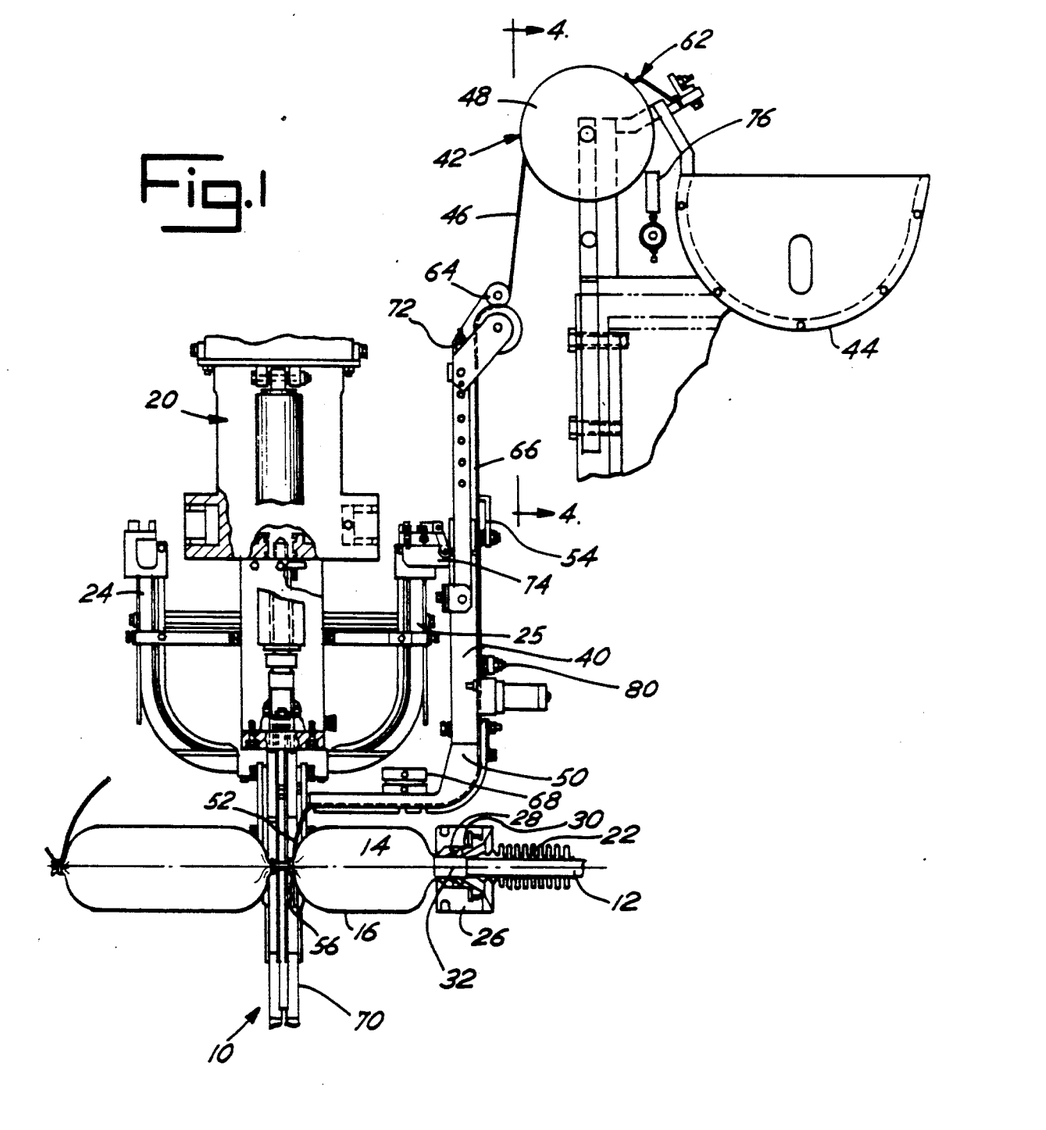
FIG. 1 is a side elevation depicting the looper assembly, clipper assembly, casing brake, and a portion of the horn of the preferred stuffing machine, with product shown during clipping.
Figure 2:
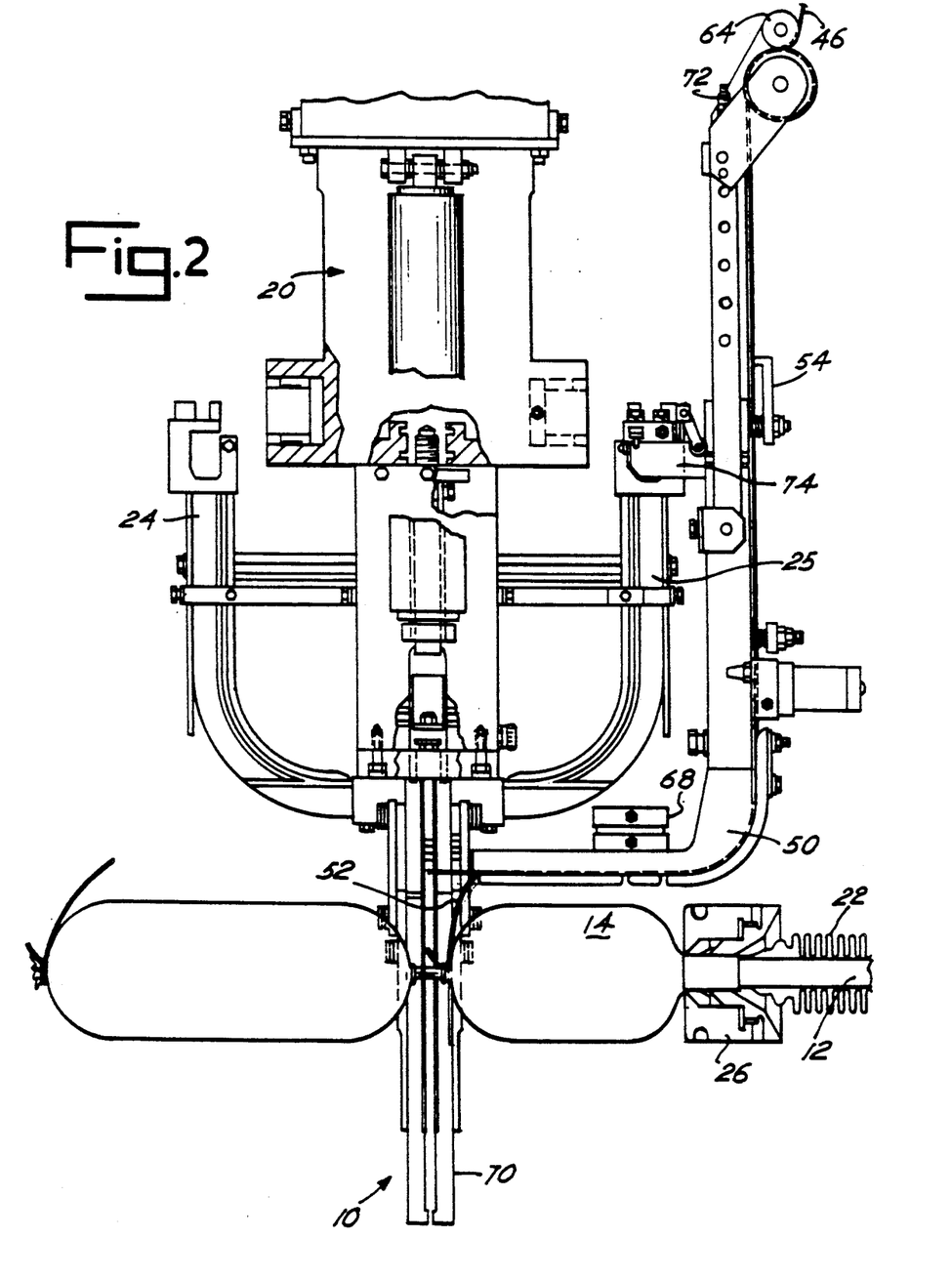
FIG. 2 is a larger, side elevation view as in FIG. 1.
Figures 3, 4:
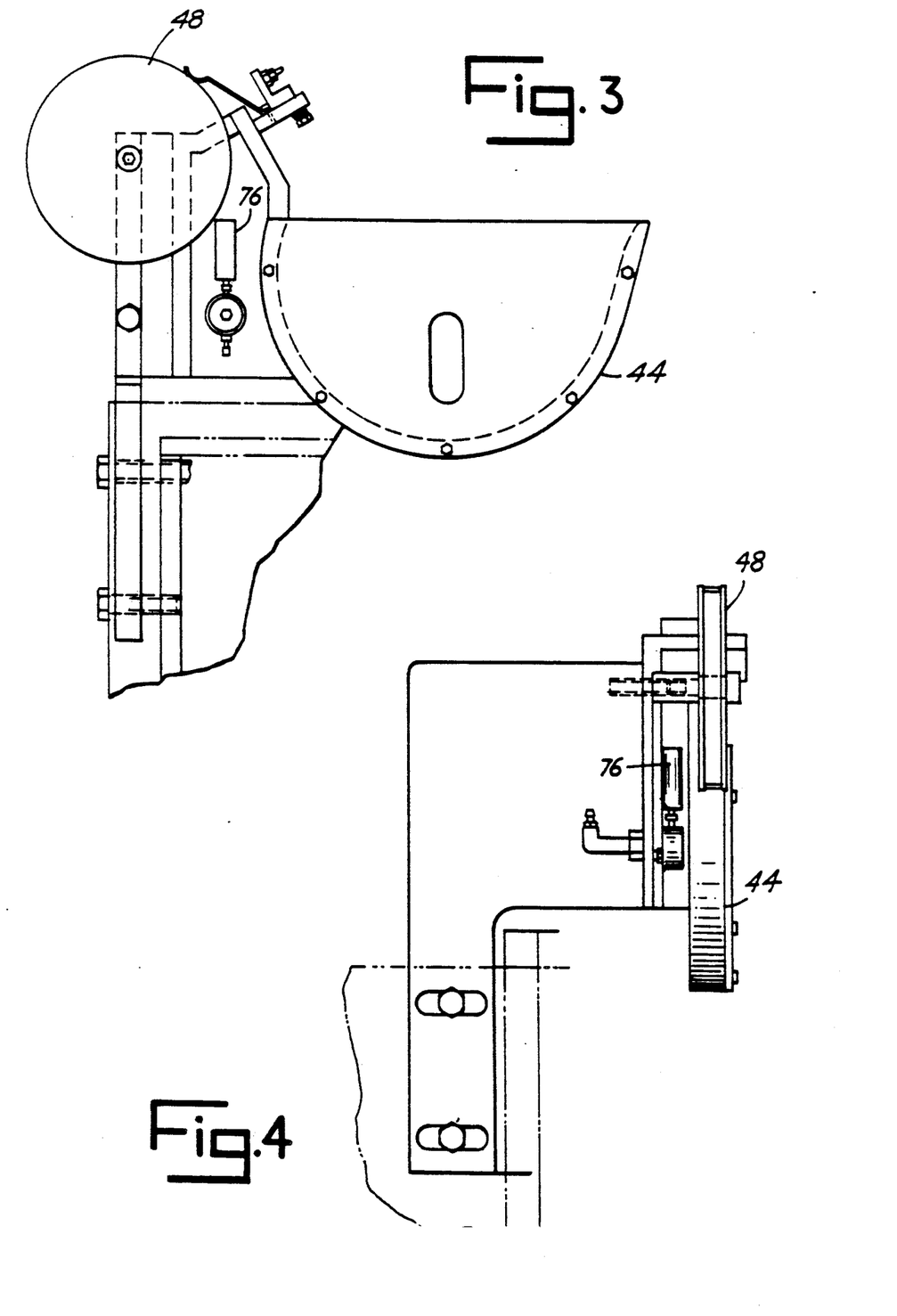
FIG. 3 is a detail, side elevation of the loop feed mechanism of the looper assembly.
FIG. 4 is an end elevation view of the mechanism of FIG. 3, taken from the left in FIG. 3.

Referring to FIG. 1, the preferred form of the invention is embodied in a stuffing machine generally designated 10 and shown in a clipping condition. The machine 10 includes a stainless steel stuffing horn 12. Comminuted material to be cased enters the machine from the right in FIG. 1, under pressure of a pump (not shown and not a part of the invention). The material, as shown at 14, exits the stuffing horn, as casing 22 stored on the horn exits a casing brake mechanism 26, forming a cased product 16. A clipping mechanism 20 intermittently voids the stuffed casing and clips the voided casing to form ends of discharged products and beginnings of next products. Clips are fed to the clipping mechanism along clip rails 24, 25 from atop the machine. Hinged translucent guards protect the machine operator and increase sanitation. All the foregoing is mounted atop a base or frame, atop wheels.

The machine 10 is semi-automatic. The machine relies upon casing loading by the operator. Once loading is complete the operator places controls in an automatic mode and initiates a cycle start function. This action starts the system on an automatic mode in which all movements are controlled automatically by electro/pneumatic control devices. Product size is controlled by either portion control contained within the filler (not shown; not a part of the invention) or length measurements via trip paddles.

A mechanism such as in U.S. Pat. No. 4,675,945 (FIGS. 10 and 11 thereof) or the above-identified patent applications reciprocates the casing brake mechanism 26 forward and rearward a short distance. In the forward position, the casing brake mechanism is in a stuffing position. In the rearward position, the casing brake mechanism is in a clipping position.

The casing brake mechanism 26 includes two annular casing brakes 28, 30. The two casing brakes 28, 30 define two portions of the casing brake mechanism. A first of the casing brakes, brake 28, is forward or downstream (product flow defining the stream) of the second brake, brake 30. As most preferred, the brakes 28, 30 are identical. An adjusting annular fitting applies a compressive force to the rear face of casing brake 30 which in turn applies a force to an annular fitting which in turn applies a compressive force to the rear face of casing brake 28. This action adjustably tightens the brakes 28, 30 and varies the tensions of the casing on the horn. As with a conventional singular casing brake, each casing brake 28, 30 tensions the casing shirred on a horn as it exits the horn through the brake. In the case of the two brakes 28, 30, each brake contributes to the required tension while the brake mechanism 26 is in the stuffing position.

In contrast, in the clipping position of the brake mechanism 26, only one brake provides tension to the shirred casing. The first portion 32 of the stuffing horn protrudes into the casing brake mechanism into operative association with both the first casing brake and the second casing brake when the casing brake mechanism and stuffing horn are in the stuffing position. The first segment protrudes into the casing brake mechanism into operative association with only one casing brake when the mechanism and horn are in the clipping position. As a result of the configuration of the horn and brakes, a full braking is applied to the shirred casing for stuffing, and a partial braking is applied for clipping.

Figure 5:
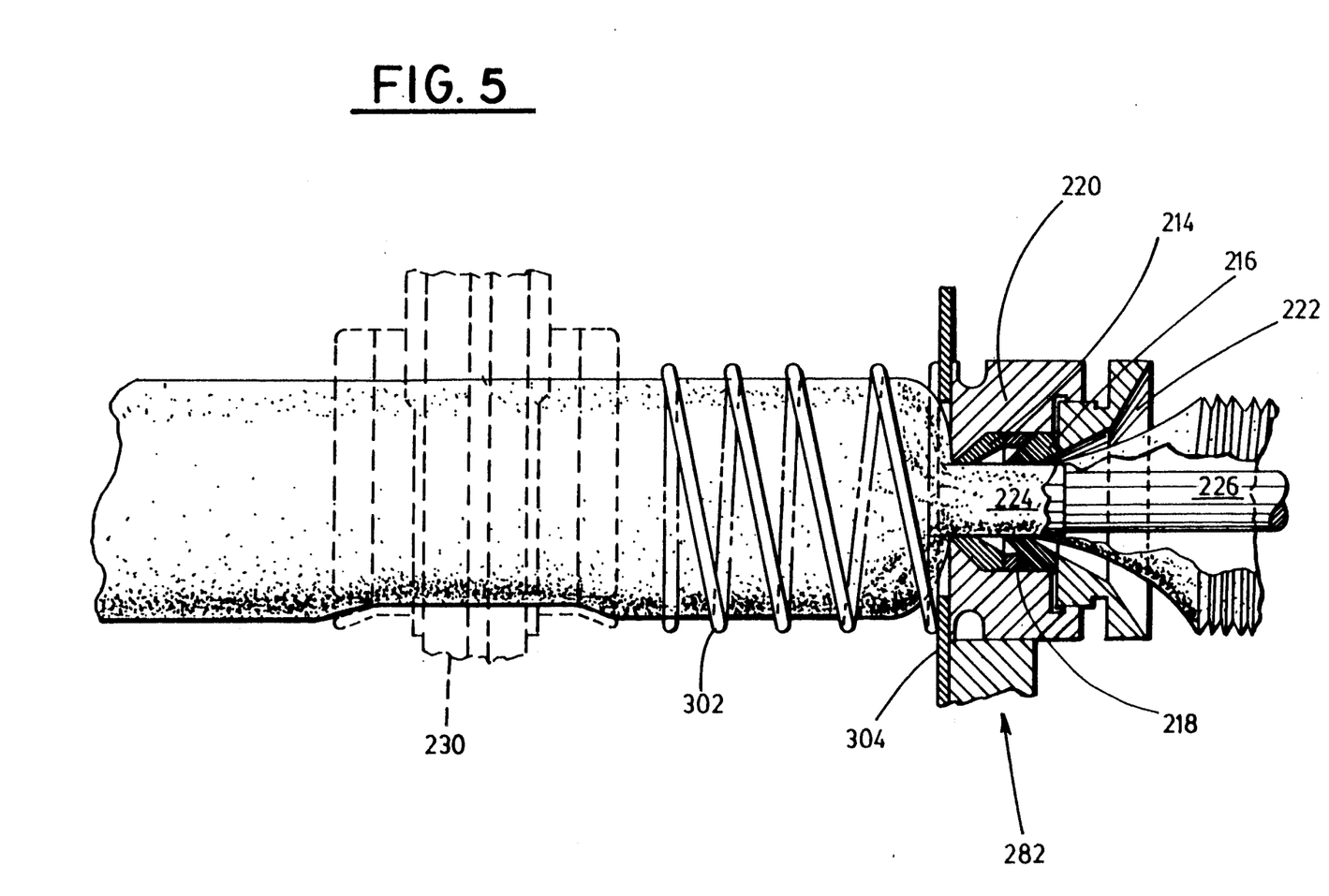
FIG. 5 is a detail, cross-sectional view of the casing brake and stuffing horn in a stuffing position.
Figure 6:
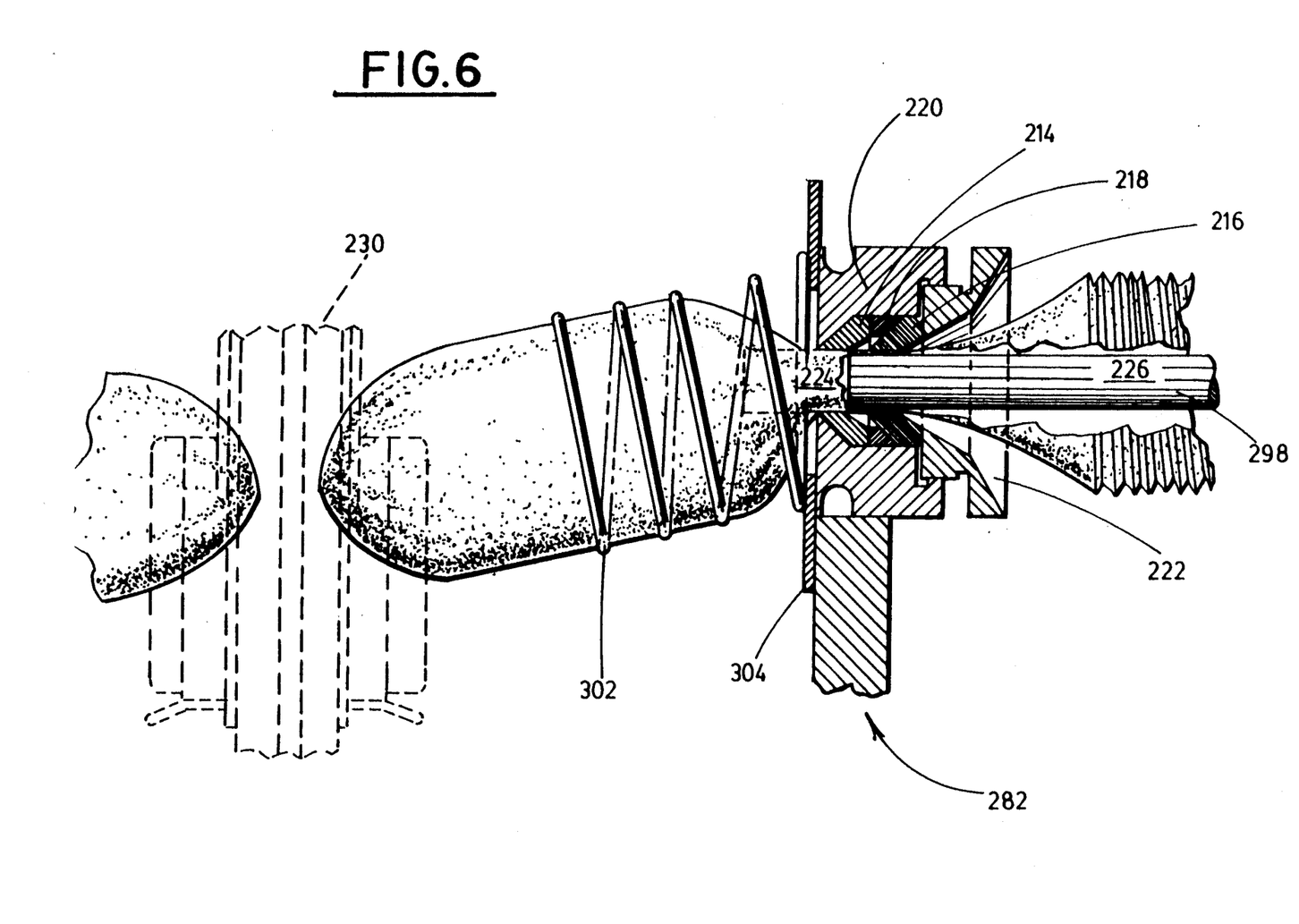
FIG. 6 is a detail, cross-sectional view of the casing brake and stuffing horn in a clipping position.
Figure 7:
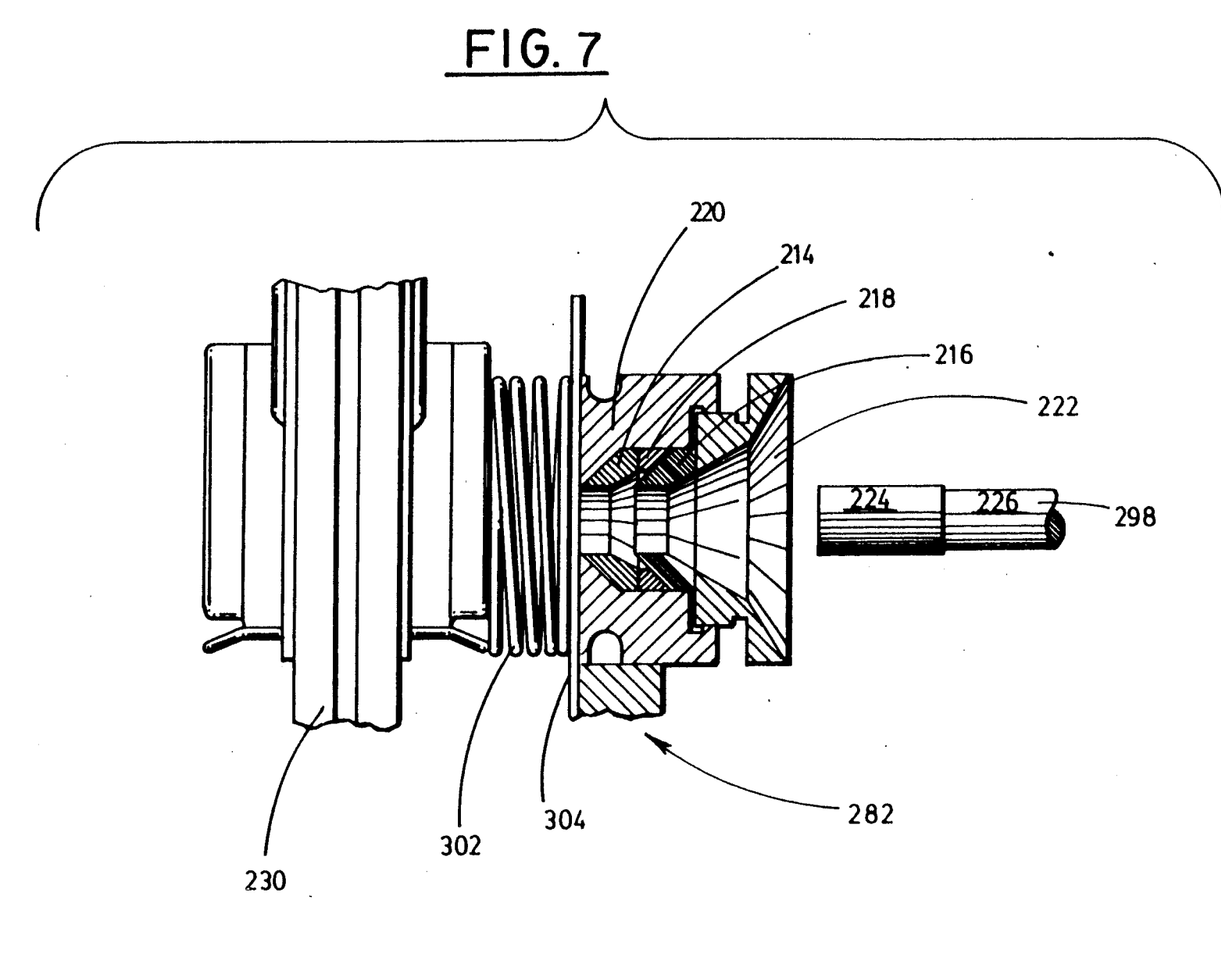
FIG. 7 is a detail, cross-sectional view of the casing brake and stuffing horn in a service position.

Referring to FIGS. 5 through 7, an alternative casing brake mechanism 282 and alternative stuffing horns having portions 298 also apply a full braking to the shirred casing for stuffing, and a partial braking for clipping. The casing brake mechanism 282 includes two annular casing brakes 214, 216. The two casing brakes 214, 216 define two portions of the casing brake mechanism. The casing brake mechanism 282 has a forward casing brake 214 which provides braking in both the stuffing and filling positions of the mechanism 282. The rearward casing brake 216 provides braking only in the stuffing position.

As most preferred, the brakes 214, 216 are identical. A first annular fitting 218 slip fits to an outer frame 220 and spaces the casing brakes 214, 216. A second annular fitting 222 screw fastens to the outer frame 220 and retains components 214, 216, 218 within frame 220. The annular fitting 222 applies an adjustable compressive force to the rear face of casing brake 216. The force of the rear face of casing brake 216 in turn applies a force to annular fitting 218, which in turn applies a compressive force to the rear face of casing brake 214. This action adjustably tightens the brakes 214, 216 to vary the tensions of the casing on the stuffing horn. As with a conventional singular casing brake, each casing brake 214, 216 tensions the casing shirred on a horn as it exits the horn through the brake. In the case of the two brakes 214, 216, each brake contributes to the required tension while the brake mechanism 282 is in the stuffing position.

In contrast, in the clipping position of the brake mechanism 282, only the second and forward brake 214 provides tension to the shirred casing. The first portion 98 of each stuffing horn includes two segments, a first segment 224, and a second segment 226. The second segment 226 has outer dimensions defined by an outer diameter which are reduced in comparison to the outer dimensions defined by the outer diameter of the first segment 224. The first segment 224 protrudes into the casing brake mechanism 282 into operative association with both the first casing brake 214 and the second casing brake 216 when the casing brake mechanism 282 and stuffing horn are in the stuffing position. The first segment 224 protrudes through the casing brake mechanism 282, and into operative association with only the forward, second casing brake 214 when the mechanism 282 and horn are in the clipping position. The second, reduced diameter segment 226 is rearward, not forward, of the first segment 224. When the mechanism and horn are in the clipping position, the rearward, second, reduced diameter portion 226 does not cooperate with the second brake 216 to provide braking.

As a result of the configuration of the horn segments and brakes, a full braking is applied to the shirred casing for stuffing, and a partial braking is applied for clipping.

An additional benefit of the alternative structure of FIGS. 5-7 is a product spring support. The support is comprised by a coiled or helical spring 302 fastened to the discharge face 304 of the casing brake mechanism 282. The spring 302 is sized in diameter to loosely surround stuffed casing as it exits the casing brake mechanism 282. The spring support has sufficient lateral strength to support the exiting stuffed casing in the area adjacent the casing brake mechanism, both during stuffing and clipping. The spring support also has sufficient lateral flexibility to permit lateral movement of product under the action of the clipper mechanism 230.

As in FIG. 7, the spring 302 is collapsible between the clipper mechanism 230 and the casing brake mechanism 282. Thus, the casing brake mechanism 282 is movable toward the clipper mechanism 230 to facilitate servicing of the horn.

Figure 8:
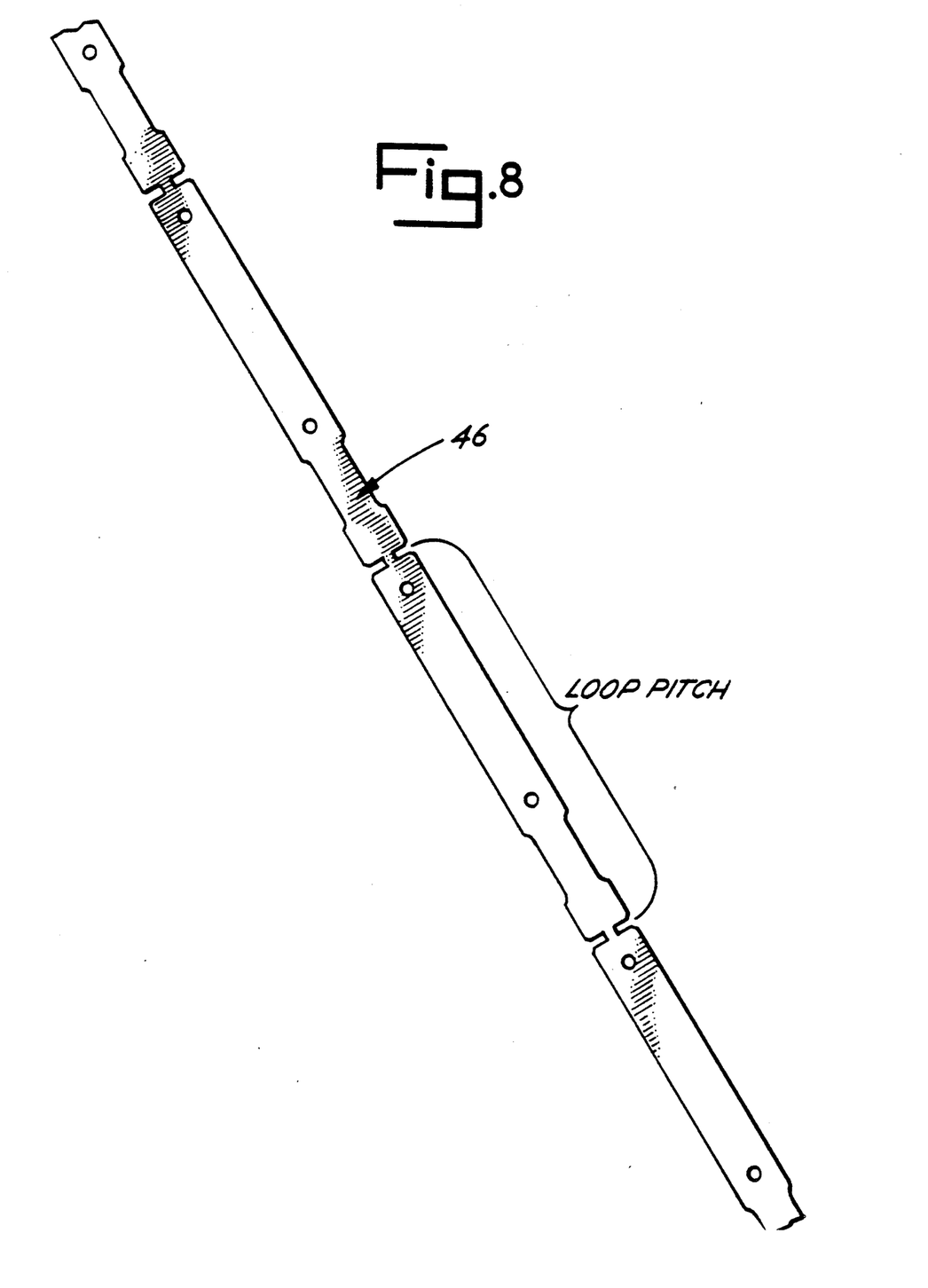
FIG. 8 is a detail of a loop strand.

Referring again to FIG. 1, a looper assembly 40 includes a loop feed mechanism 54, a support guide 42, a last loop sensor 62, and a loop supply tray 44 from which loops joined end-to-end as at 46 in FIG. 8 are fed.

A supply of loops is placed in the support tray 44 and the leading end is then passed beneath the last loop sensor 62 and about the guide channel of the support guide 42. After leaving the support guide 42 the loop strand 46 passes through an additional set of guides 64. Exiting the additional guides 64, the loop strand 46 enters a guide track 66 contained on the looper assembly 40. From the guide track 66 the loop strand 46 passes through the lower guide assembly 50 past the cutoff knife assembly 68, and then into the upstream die support 70.

The looper assembly 40 also contains a feed stroke adjustment screw 72, which provides for manual setting of the feed stroke relative to the pitch of the loops being used. An end of stroke sensor 74, which is used to inhibit the cutoff knife assembly 68 functions until the drive pawl assembly 54 has reached its full stroke. Also included is an audible alarm 76 which is operated by the last loop sensor 62 and control circuit to produce a penetrating sound of approximately 1000 HZ at 50 PSIG to acoustically call attention to the last loop of the loop strand 46.

LOOP OPERATION

When power is first applied to the circuitry the drive pawl assembly 54 is in the upward position against the base of the feed stroke adjustment screw 72. At this time the loops are passed from the tray assembly 44 beneath the last loop sensor 62 over the support guide 42, through the additional guides 64 down through the guide track 66 on the looper assembly 40, placed to the point where the leading edge of the loop strand 46 is at the inbound edge of the cutoff knife assembly 68. The brake assembly 80 on the looper assembly 40 is pressurized and clamps the loop strand 46 to prevent any movement of the loop strand. Upon receiving an input signal from a control circuitry the brake assembly 80 is released, the drive pawl assembly 54 engages the loop strand and drives in a downward direction against the main body of the feeder assembly, at which point forward moment is terminated. Once this is accomplished the end of the stroke sensor 74 is activated. When air is applied to the blind end of the gate cylinder of the clipper, air passes through the end of stroke sensor 74 to pressurize the blind end of the cutoff knife assembly 68. The cutoff knife assembly 68 severs the loop extending from the cutoff knife assembly 68 into the upstream side die support of the clipper from the loop strand.

When the punch is extended, it engages a clip, driving the clip downward through the clip channel on the die support assembly. This motion grasps the loop assembly in the notch provided and transports both the clip and the loop down through the die support assembly, placing both about the leading end of the chub 14. While this is happening, the skin brake assembly 26 is operated in a rear direction, relieving tension on the casing. Relieved tension on the casing provides significant slackness on the inbound end of the product 14 such that this action will prevent fracture of the casing while the loop and clip are being placed about the stuffed casing. When the fill cycle is reinitiated, the loop which is now placed about the leading end of product 14 is carried forward with the product. The next loop will be fed upon command from the control circuit. A uniqueness of the looper placement, in combination with the skin brake slacking arrangement, is that the significant amount of tension which is placed on the casing during the fill cycle is relieved momentary while the clips are placed about of the casing. This sequence allows for a reduced tension, and this in turn provides additional safety margins in applying the loops without tearing of the casing. This is a most significant feature of the combination.

When the last loop in the strand has reached the last loop sensor 62, the sensor 62 operates and an air signal is passed by way of a control circuit to the audible alarm 76.

What is claimed is:

1. In a stuffing machine for stuffing comminuted material in casing to form chubs, the machine comprising a stuffing horn means for the passage of comminuted material and for the provision of casing, and further comprising casing brake means for controlling casing withdrawal from the horn means in relation to the exiting of comminuted material from the horn means, the improvement comprising:

a product support comprising a helical spring mounted adjacent the discharge end of the casing brake means defining and extending along the path of the stuffed casing, the spring, having a diameter sized to permit the spring to surround the stuffed casing exiting the casing brake means and having a lateral strength to support the stuffed casing.

2. An improvement as in claim 1, the product spring support having lateral flexibility to permit lateral movement of stuffed casing.

3. An improvement as in claim 1, the product spring support being at least partially collapsible toward the casing brake means.

* * * * *